(12) United States Patent
Urquhart et al.

(10) Patent No.: US 9,992,464 B1
(45) Date of Patent: Jun. 5, 2018

(54) METHOD AND SYSTEM FOR SCREEN CORRECTION (71) Applicant: CHRISTIE DIGITAL SYSTEMS USA, INC., Cypress, CA (US)

(72) Inventors: Daniel Thomson Urquhart, Kitchener (CA); Ian Chadwyck Faragher, Kitchener (CA); Derek Scott, Kitchener (CA); Peter Anthony Van Eerd, Guelph (CA); Nicholas David Jankovic, Waterloo (CA); Kevin Moule, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days. days.

(21) Appl. No.: 15/423,299

(22) Filed: Feb. 2, 2017

Related U.S. Application Data

(60) Provisional application No. 62/420,947, filed on Nov. 11, 2016.

(51) Int. Cl.
*H04N 9/31* (2006.01)
*H04N 13/02* (2006.01)

(52) U.S. Cl.
CPC ......... *H04N 9/3185* (2013.01); *H04N 9/3147* (2013.01); *H04N 9/3194* (2013.01); *H04N 13/0239* (2013.01)

(58) Field of Classification Search
CPC .... G03B 21/13; G03B 21/147; H04N 9/3147; H04N 9/3185; H04N 9/3194
See application file for complete search history.

(56) References Cited

U.S. PATENT DOCUMENTS

| 6,249,289 | B1 | 6/2001 | Arnaud et al. |
| 8,311,366 | B2 | 11/2012 | Schiewe et al. |
| 8,766,998 | B1 | 7/2014 | Morgan, III et al. |
| 9,195,121 | B2 | 11/2015 | Sajadi et al. |
| 9,369,683 | B2 | 6/2016 | Timoner et al. |
| 9,632,404 | B2 * | 4/2017 | Grundhofer .......... G02F 1/0147 |
| 2002/0008697 | A1 * | 1/2002 | Deering ................. G06T 5/006 345/418 |
| 2004/0141156 | A1 * | 7/2004 | Beardsley et al. ... G06K 9/2036 353/69 |

(Continued)

FOREIGN PATENT DOCUMENTS

| WO | 200160058 A1 | 8/2001 |
| WO | WO-2004086755 A1 | 10/2004 |
| WO | WO-2010138128 A1 | 12/2010 |

OTHER PUBLICATIONS

Extended European Search Report dated Aug. 30, 2017, by EPO, re European Patent Application No. 17159600.

*Primary Examiner* — Sultan Chowdhury
(74) *Attorney, Agent, or Firm* — Perry + Currier, Inc.

(57) ABSTRACT

A method, system, and a computer readable medium for screen correction is provided. The system includes a memory storage unit for storing model content, a screen having screen parameters, an input device for receiving the screen parameters, a correction engine, and a projector. The method involves storing model content on a memory storage unit, receiving screen parameters, generating screen content, and projection at least a portion of the screen content onto the screen. The computer readable medium encoded with codes for directing a processor to carry out the method.

18 Claims, 7 Drawing Sheets

(56) References Cited

U.S. PATENT DOCUMENTS

| | | |
|---|---|---|
| 2004/0257540 A1 | 12/2004 | Roy et al. |
| 2009/0067749 A1* | 3/2009 | Schiewe et al. ..... H04N 9/3185 382/294 |
| 2009/0086081 A1 | 4/2009 | Tan et al. |
| 2009/0213335 A1* | 8/2009 | Kondo ................... G03B 37/04 353/30 |
| 2010/0171930 A1* | 7/2010 | Kurosawa .............. G03B 21/26 353/30 |
| 2016/0080710 A1 | 3/2016 | Hattingh et al. |
| 2016/0173841 A1* | 6/2016 | De La Cruz et al. ................... G03B 21/147 353/70 |

\* cited by examiner

METHOD AND SYSTEM FOR SCREEN CORRECTION

FIELD

The present specification relates generally to projector systems, and more particularly to projector systems displaying content on a specific screen.

BACKGROUND

Prior to displaying content on a screen, the content is generally rendered for a particular setup. Content displayed on the screen may still appear misaligned on the screen even following a very good calibration. Screen position and geometry are critical when content overlaps from two projectors located at different positions.

SUMMARY

In accordance with an aspect of the invention, there is provided a system for screen correction. The system includes a memory storage unit for storing model content. The model content is rendered to be displayed in accordance with model parameters. The system further includes a screen having screen parameters. The system also includes a correction engine in communication with the memory storage unit and the input device. The correction engine is configured to process the model content and the screen parameters to generate screen content. Additionally, the system includes a first projector in communication with the correction engine. The first projector is configured to receive a first portion of the screen content and to project the first portion the screen content onto the screen.

The system may further include a second projector in communication with the correction engine. The second projector may be configured to receive a second portion of the screen content and to project the second portion of the screen content onto the screen, wherein the first portion of the screen content and the second portion of the screen content overlap on the screen.

The screen may be non-planar.

The screen may be curved.

The screen may include a plurality of topographical reference points.

The plurality of topographical reference points may define a plurality of facets.

The input device may be a camera configured to measure the screen parameters.

The camera may measure the screen parameters using a calibration pattern projected by the first projector.

The camera may periodically scan the screen to determine the screen parameters.

The input device may be a 3D scanning unit.

In accordance with an aspect of the invention, there is provided a method of screen correction. The method involves storing model content on a memory storage unit, wherein the model content is rendered to be displayed in accordance with model parameters. The method also involves receiving screen parameters of a screen via an input device. In addition, the method involves generating screen content by processing the model content and the screen parameters at a correction engine. The method further involves projecting at least a first portion the screen content onto the screen using a first projector in communication with the correction engine.

The method may further involve projecting a second portion of the screen content onto the screen using a second projector in communication with the correction engine, wherein the first portion of the screen content and the second portion of the screen content overlap on the screen.

Projecting the first portion and the second portion of the screen content the screen may involve projecting on a non-planar surface.

The method may further involve defining a plurality of facets using a plurality of topographical reference points on the screen.

Receiving screen parameters may involve measuring the screen parameters with the input device.

The method may further involve projecting a calibration pattern to measure the screen parameters.

The method may further involve periodically scanning the screen to determine the screen parameters.

The input device may be a camera.

The input device may be a 3D scanning unit.

In accordance with an aspect of the invention, there is provided a non-transitory computer readable medium encoded with codes. The codes direct a processor to store model content on a memory storage unit, wherein the model content is rendered to be displayed in accordance with model parameters. The codes further direct the processor to receive screen parameters of a screen via an input device. In addition, the codes further direct the processor to generate screen content by processing the model content and the screen parameters at a correction engine. Furthermore, the codes further direct the processor to project at least a first portion the screen content onto the screen using a first projector in communication with the correction engine.

BRIEF DESCRIPTION OF THE DRAWINGS

Reference will now be made, by way of example only, to the accompanying drawings in which.

DETAILED DESCRIPTION OF THE EMBODIMENTS

Figure 1:
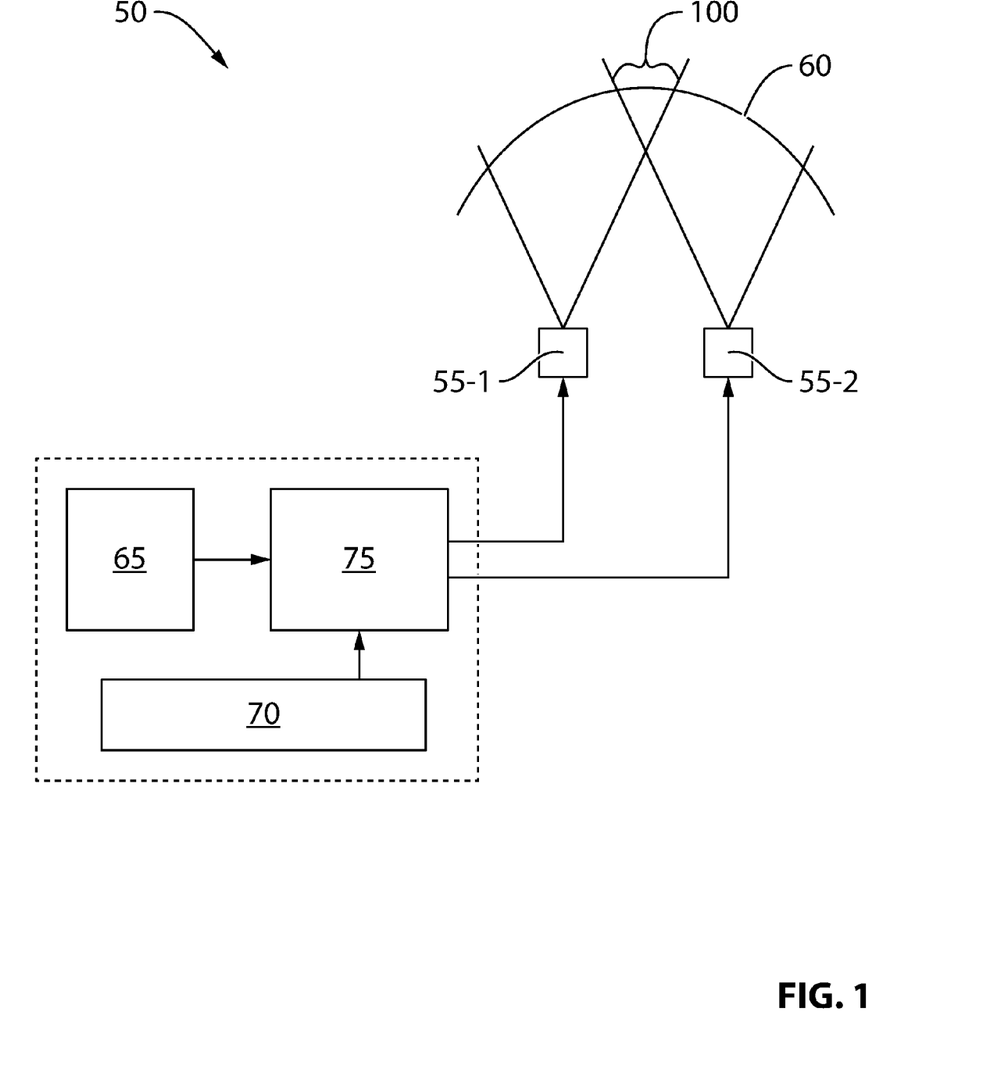
FIG. 1 is a schematic drawing of a system in accordance with an embodiment.

Referring to FIG. 1, a system for screen correction is generally shown at 50. It is to be understood that the system 50 is purely exemplary and that it will become apparent to those skilled in the art that modifications to the system 50 are contemplated. Examples of variations are discussed in greater detail below and various components can be substituted and/or added depending on the requirements of the system 50. The system 50 is generally configured to project content from at least one projector onto a screen.

In the present embodiment, the system 50 includes projectors 55-1 and 55-2 (generically, projector 55 and collectively projectors 55, this nomenclature is used elsewhere herein), a screen 60, a memory storage unit 65, an input device 70, and a correction engine 75. It is to be appreciated by a person of skill in the art with the benefit of this description that the system 50 is not necessary assembled by a single party and various components can be sourced from various sources specialized in the manufacture of the component. In addition, the geometry of the system 50 is not particularly limited and can be varied based on the application as discussed in greater detail below. Furthermore, the system 50 can be operated using one or more processors in communication with the various components.

The projector 55 is generally configured to receive content for projecting images. It is to be understood by a person of skill in the art with the benefit of this description that the projector 55 is not particularly limited and that several variations are contemplated. For example, in the present embodiment the projector is a digital multimirror device projector. In other embodiments, the projector can be substituted with another type of projector such as an analog projector, a digital projector, a cinema projector, an LCOS (Liquid Crystal on Silicon) based projector, or any other device capable of outputting a projection of a raster image.

The screen 60 is generally configured to receive light from the projectors 55 and to display a generated image to an audience. The screen 60 is not particularly limited and can be made from any type of material or coating suitable for the application. In the present embodiment, the screen 60 is non-planar. In particular, the screen 60 is curved with an approximate spherical curvature. However, in other embodiments, the screen 60 can have another geometry. Although FIG. 1 illustrates the screen receiving an image from the projectors and reflecting the light to the audience (front projection), other embodiments can use a screen that receives light from behind the screen relative to the audience (back projection). It is to be appreciated by a person of skill with the benefit of this description that the screen 60 is generally constructed to typical construction tolerances, such as one percent. For example, the screen 60 can be approximately 25 meters wide and have a tolerance of up to 25 centimeters for any given dimension. Accordingly, the curvature of the screen 60 and the edges of the screen 60 can be offset by a substantial distance relative to the typical 3 millimeter pixel size for a screen of this size.

Accordingly, the actual screen parameters of the screen 60 can be different from the dimensions of the screen 60 from the original blueprints. This is typical of most construction projects and would vary based on the skills and tendencies of the workers building the screen. In addition, due to external conditions, the screen 60 can shift from the original position after construction. For example, temperature fluctuations can cause the screen 60 or components of the screen 60, such as joints, to expand and contract. As another example, the screen 60 can settle over time or from vibrations such as vehicle traffic or heavy machinery within the vicinity. Therefore, the actual screen parameters, which can be obtained using a 3D mapping of various points of the screen relative to the projector, can be different from the 3D model parameters from the original blueprints.

The screen parameters are not particularly limited. For example, screen parameters can include the dimensions of the screen, the curvature of the screen, the location of predetermined topographical reference points, or whether the screen is a front projection screen or back projection screen.

The memory storage unit 65 is generally configured to store model content. Model content refers to content provided by a content producer that has been rendered for the system 50 in accordance with model parameters, which are the assumed parameters of the system 50 based on original blueprint specifications or an approximated ideal screen model. The memory storage unit 65 is not particularly limited and can include non-volatile memory, such as flash drives, and optical or magnetic discs, or volatile memory. The memory storage unit 65 can also be removeable such as an optical disc or a flash drive such that the content can be used as part of multiple systems at different location or such that the content can be easily delivered from a content producer to the system 50. In other embodiments, the memory storage unit 65 can also receive the content from a network. It is to be appreciated that the memory storage unit 65 can be used for any other purpose in the system 50. For example, the memory storage unit 65 can be used to store codes for operating the system 50. As another example, the memory storage unit 65 can be used to store actual screen data as discussed in greater detail below.

In the present embodiment, the content stored on the memory storage unit 65 is configured to be used on the system 50. For example, the content can include two portions. The first portion can be configured to be projected by the projector 55-1 and the second portion can be configured to be projected by the projector 55-2. The content stored on the memory storage unit 65 is rendered based on model parameters provided to the producer. In the present embodiment, the model parameters are the dimensions from the original blueprints of the system 50.

In other embodiments, it is to be appreciated by a person of skill with the benefit of this description that the model parameters can be an assumed shape that approximated the design parameters of the system 50. For example, if the screen 60 were originally designed to have a parabolic curvature, the model parameters can be dimensions of a spherical curvature that approximates the originally designed to have a parabolic curvature. This approximation can be made to simplify the rendering process of the content such that less computational resources are required to produce the content. For example, parametric screens can use models based on standard geometries, such as planes, spheres, or cylinders. Other examples can use mesh screens defined as a dense 3D mesh, such as one imported from a 3D CAD package.

The input device 70 is generally configured to receive the actual screen parameters. The manner by which the input device 70 receives the actual screen parameters is not particularly limited. In the present embodiment, the actual screen parameters are uploaded from a flash drive such that the input device 70 is a flash drive reader. In other embodiments, the input device 70 can be a user input device such as a keyboard for manually entering the actual screen parameters. In further embodiments, the input device 70 can be a device configured to measure the actual screen parameters, such as a 3D scanning unit, for example, a laser scanner or a camera.

The correction engine 75 is generally configured to process the model content stored on the memory storage unit 65 using the actual screen parameters received from the input device 70 to generate screen content for projecting a corrected image onto the screen 60 which accounts for differences between the model parameters and the actual screen parameters. It is to be appreciated that in a variation, the correction engine 75 can also receive the actual screen parameters stored in the memory storage unit 65 if it was previous entered. In further embodiments, the correction engine 75 can include a separate memory storage unit (not shown) for storing actual screen parameters.

In the present embodiment, there are two projectors 55-1 and 55-2 configured to receive content for projecting images as shown in FIG. 1. The model content intended to be projected onto the screen can be divided into two portions. The projector 55-1 is configured to project a first portion of the content and the projector 55-2 is configured to project a second portion of the content where the two portions can be combined to form the overall content. In the present embodiment, the portion projected by the projector 55-1 overlaps with the portion projected by the projector 55-2 within an overlap region 100.

Figure 2:
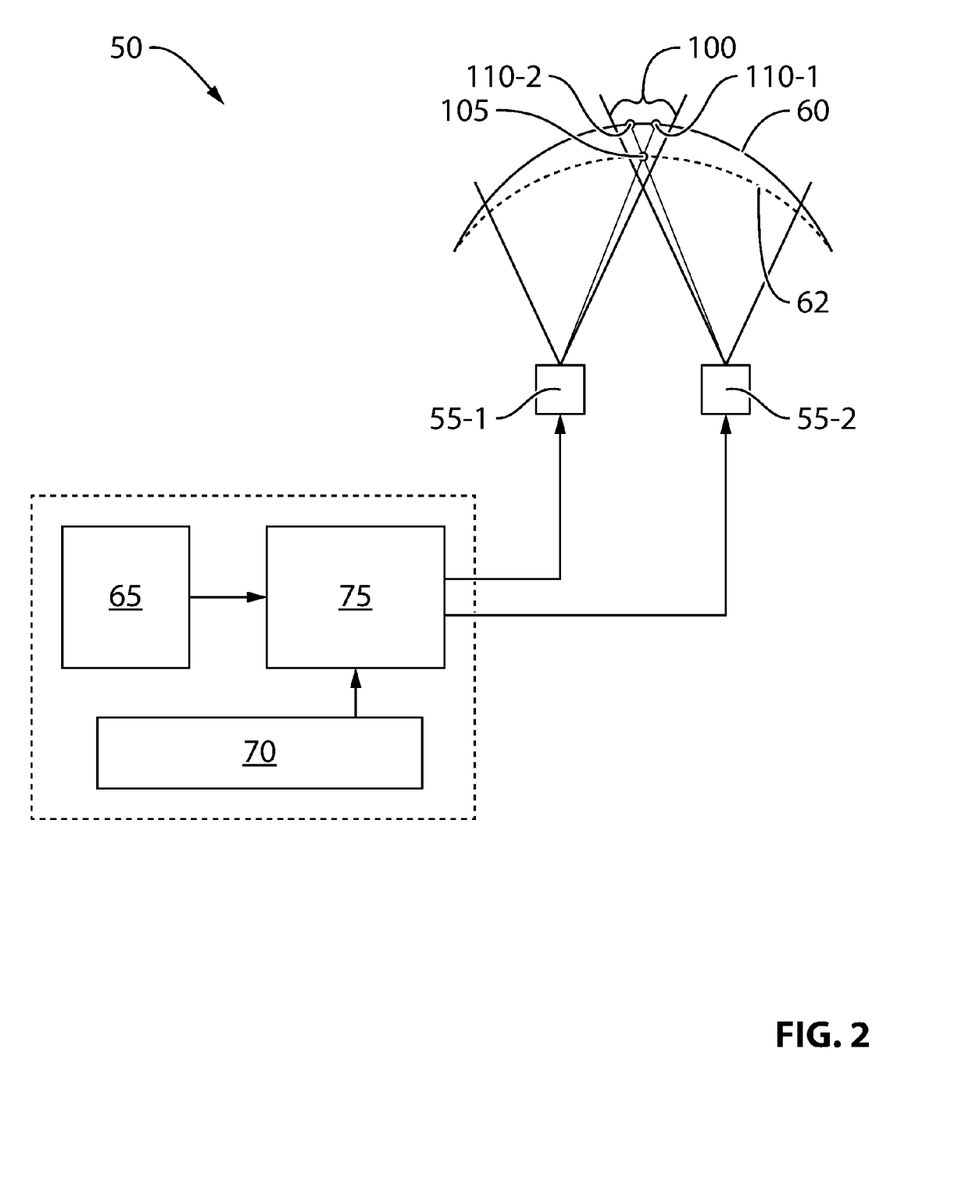
FIG. 2 is a schematic drawing of a system of FIG. 1 in operation with the correction engine deactivated.

Referring to FIG. 2, the operation of the system 50 is illustrated with the correction engine 75 deactivated. The model content stored on the memory storage unit 65 is rendered to be displayed on a model screen 62. As shown, a point 105 in the overlap region 100 would receive light from the projectors 55-1 and 55-2. Since the content was rendered from the content producer using model parameters associated with the model screen 62, the point 105 would separate and hit the screen 60 at two locations 110-1 and 110-2. Accordingly, when viewed by an audience, this would produce a double image on the screen 60 and therefore diminish the user experience.

Figure 3:
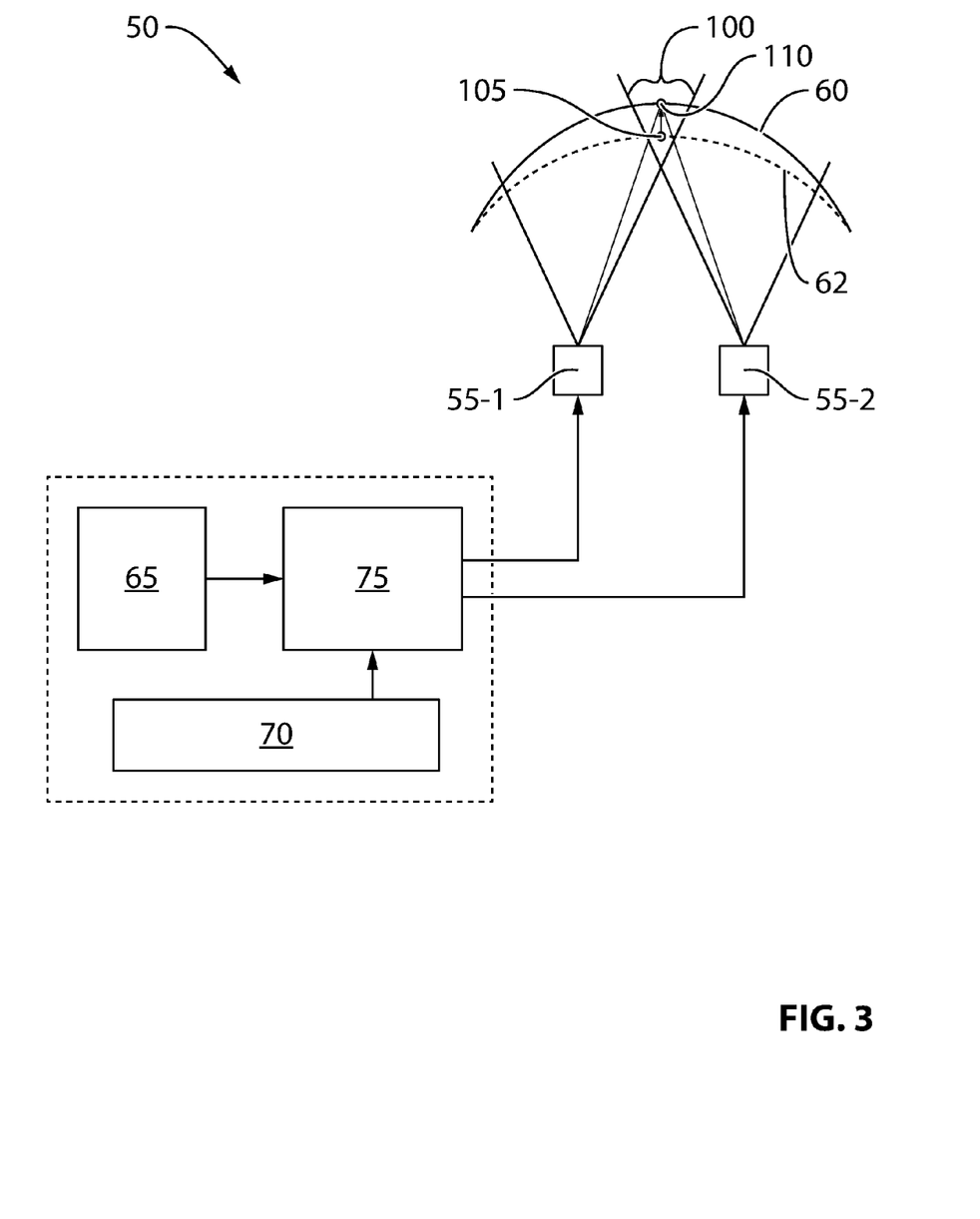
FIG. 3 is a schematic drawing of a system of FIG. 1 in operation with the correction engine activated.

Referring to FIG. 3, the operation of the system 50 is illustrated with the correction engine 75 activated. As shown, the point 105 in the overlap region 100 is mapped from the model screen 62 to the screen 60 at a single location 110. In the present embodiment, the point is mapped to a (u, v) Cartesian coordinate system (UV mapped). However, it is to be appreciated that the manner by which the point is translated from the model screen 62 to the screen 60 is not particularly limited. Since the point 105 intended for the model screen 62 now appears at a single point on the screen 60, the double image in the overlap region 100 that would have been generated without the correction engine 75 (such as shown in FIG. 2) would not be present. However, it is to be understood that by mapping the screen content onto the screen 60, some warping of images may occur. Depending on the amount of deviation of the screen 60 from the model screen 62, the amount of warping can be small or unnoticeable to an audience, whereas a double image would be very noticeable since the image is no longer sharp. Furthermore, it is to be appreciated that the mapping can also account for the location of the audience to reduce the effects of image warping. For example, the mapping can be performed relative to an eye-point. In other embodiments, the mapping can be done relative to the surface normal of the screen 60 or using topographical reference points as discussed in greater detail below. It is to be appreciated by a person of skill in the art that a mapping derived from the eye-point is more suitable when the audience will primarily view the display from a small area known in advance, such as in a flight simulator. Other approaches, such as using the screen normal or using topographical reference points to map between screens are more appropriate when the audience is not constrained to a small viewing area, such as for digital signage applications.

Figure 4:
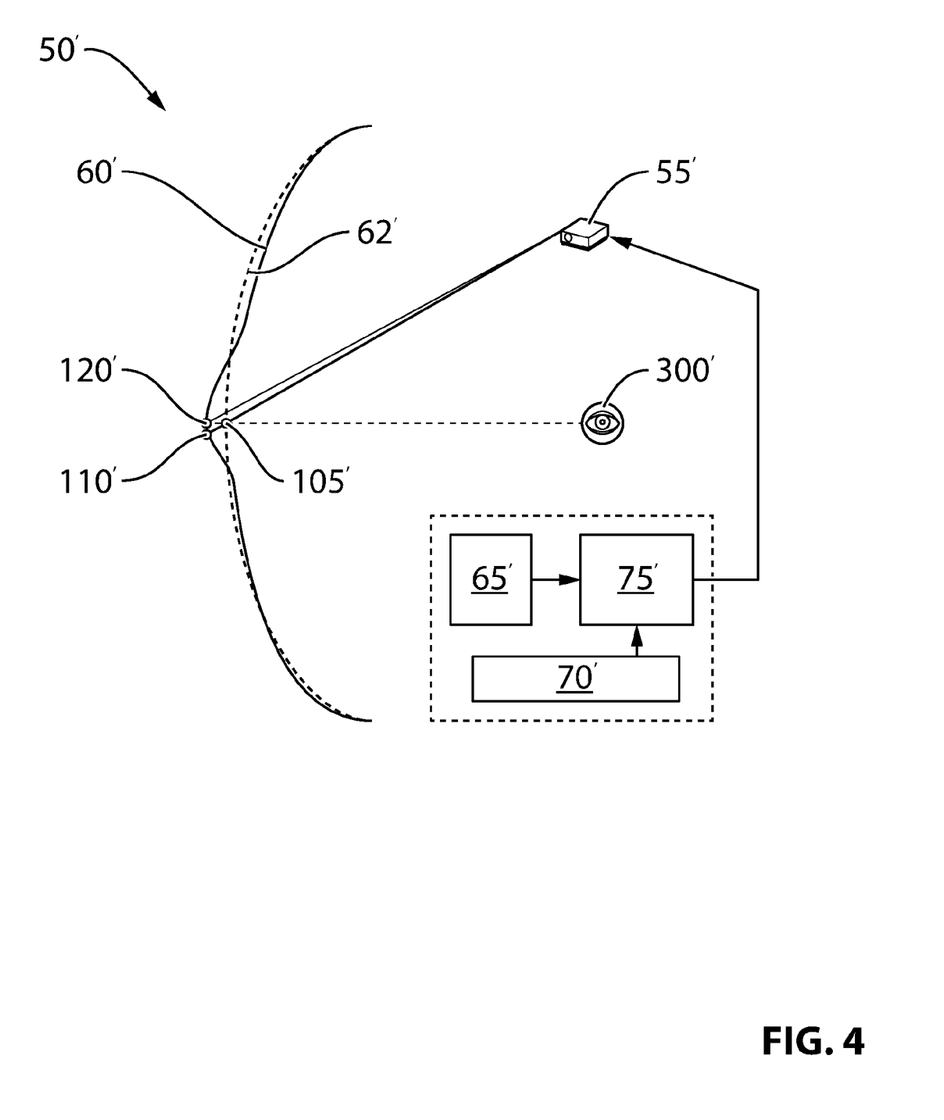
FIG. 4 is a schematic drawing of a system in accordance with another embodiment.

It is to be appreciated by a person of skill with the benefit of this description that the system 50 can be modified to also reduce the appearance of imperfections in the screen. Referring to FIG. 4, a system 50' is generally shown with an imperfect screen 60'. The screen 60' can be designed to have a smooth curvature, but manufacturing defects or subsequent damage can cause the screen to have the warped shape shown in FIG. 4. The system 50' also includes a projector 55', a memory storage unit 65', an input device 70', and a correction engine 75', each of which function similar to the corresponding components from FIG. 1. It is to be appreciated that the model content store on the memory storage unit 65' is rendered to be displayed on a model screen 62'. Deviations of the screen 60' from the model screen 62' results in warping as an image point intended to be displayed on the model screen 62' at point 105' would appear at point 110' on the screen 60' viewed from an eyepoint 300' when the correction engine 75' is deactivated. When the correction engine 75' is activated, the point 110' is translated to the point 120', which would be at the same position as the intended point 105' when viewed from the eyepoint 300' and thus reducing the appearance of the imperfection of the screen 60'.

Figure 5:
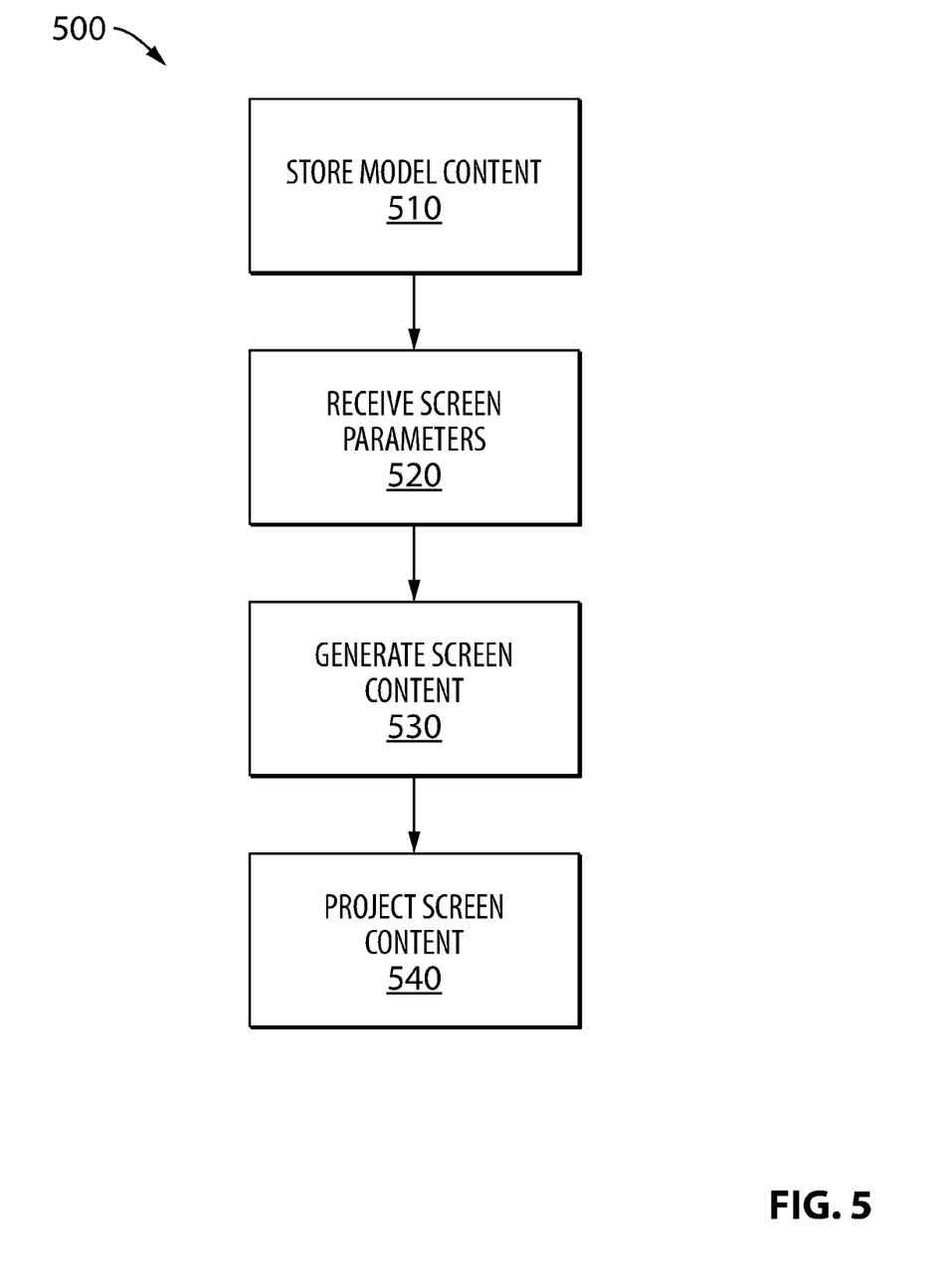
FIG. 5 is flow chart of a method in accordance with an embodiment.

Referring to FIG. 5, a method of screen correction is represented in the form of a flow-chart and indicated generally at 500. For illustrative purposes, it can be assumed the method 500 is implemented using the system 50 described above. However, it is to be understood that the method 500 is not limited to the system 50 and can be implemented on a wide variety of systems. Furthermore, the following discussion of the method 500 will lead to further understanding of the system 50 and its various components. Although some blocks of the method 500 are described below as occurring within certain components of the system 50, it is to be understood that the system 50 or the method 500 can be varied, and need not work exactly as discussed herein in conjunction with each other.

Beginning at block 510, model content is stored on the memory storage unit 65. The manner by which the model content is obtained or transferred to the memory storage unit 65 is not particularly limited. For example, the model content can be downloaded via a network connection or transferred manually using a portable computer readable storage medium, such as an optical disc or a flash drive.

Block 520 involves receiving screen parameters of the screen 60. The manner by which the screen parameters are obtained are not particularly limited. In the present embodiment, the screen parameters are obtained by performing a laser scan of the physical screen 60 and manually entering the information via the input device 70.

Block 530 comprises generating screen content based on the model content stored in the memory storage unit 65 using the screen parameters received at block 520. In the present embodiment, the correction engine 75 uses points from the model content and maps the model content onto the screen 60 (as determined from the screen parameters) using a UV layout. The UV layouts can be automatically generated from the projector centric channel extents or any other content channel definition. The UV layouts can be saved in a lookup table where model content can be readily converted into screen content using substantially less computation resources than if the content were to be re-rendered for the screen 60.

Next, block 540 involves projecting the screen content onto the screen 60. The manner by which the screen content is projected is not particularly limited. In the present embodiment, the screen content is projected by the projectors 55, where the screen content is corrected for deviations of the physical screen 60 from the model screen 62 such that the image appears sharper by reducing double imaging.

Figure 6:
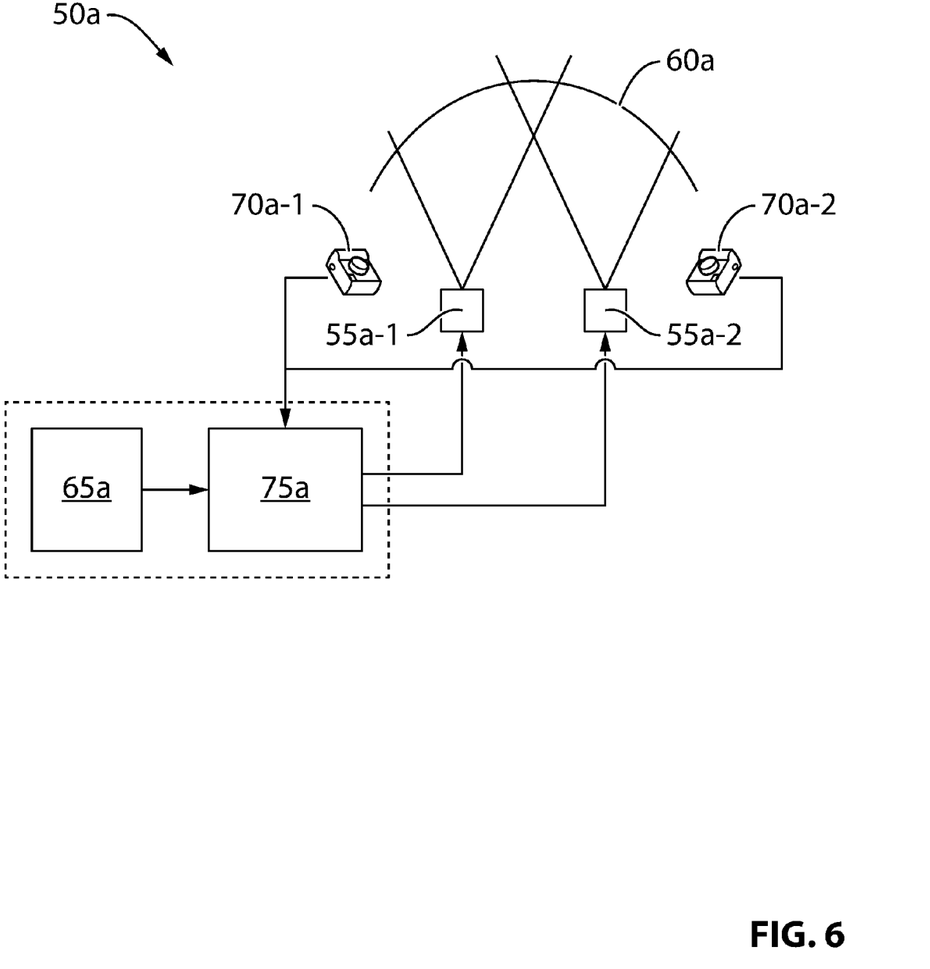
FIG. 6 is a schematic drawing of a system in accordance with another embodiment.

Referring to FIG. 6, another embodiment of a system for screen correction is generally shown at 50*a*. In the present embodiment, like components of the system 50*a* bear like reference to their counterparts in the system 50, except followed by the suffix "a". In the present embodiment, the system 50a includes projectors 55a-1 and 55a-2, a screen 60a, a memory storage unit 65a, cameras 70a-1 and 70a-2, and a correction engine 75a.

In the present embodiment, the cameras 70a-1 and 70a-2 are used to provide the screen parameters to the correction engine 75a. For example, the cameras 70a-1 and 70a-2 can be used to detect a calibration pattern projected onto the screen 60a to determine the screen parameters. The manner by which the calibration pattern is projected is not particularly limited. For example, the calibration pattern can be projected using one or both of the projectors 55a and the screen parameters measured using the cameras 70a as a stereo pair. In the other embodiments, the calibration pattern can be projected using an additional projector configured specifically for projecting calibration patterns.

It is to be appreciated by a person skilled in the art that the calibration pattern need not be visible to a human eye. In some embodiments, the calibration pattern can be projected onto the screen 60a in an ultraviolet or infrared spectrum such that the audience would not be able to view the calibration process. In other embodiments, the test pattern can be integrated into the visible spectrum temporarily over a very short period of time to make the test pattern substantially invisible to a human eye. By using an invisible calibration pattern, the cameras can be collecting data during the projection of content on the screen 60a without an audience noticing and thus provide the ability to adjust for variations on the fly on a screen 60a that may move slightly due to vibrations or other factors during the projection of content. Accordingly, the cameras 70a can be configured to scan the screen periodically to determine screen parameters.

It is to be re-emphasized that the system 50a described above is a non-limiting representation. For example, the system 50a can be modified to be function with a single camera measuring a point cloud from a single projector such that the camera and projector form a stereo pair. In addition, the camera 70a can be substituted with another input device for periodic scanning.

Figure 7:
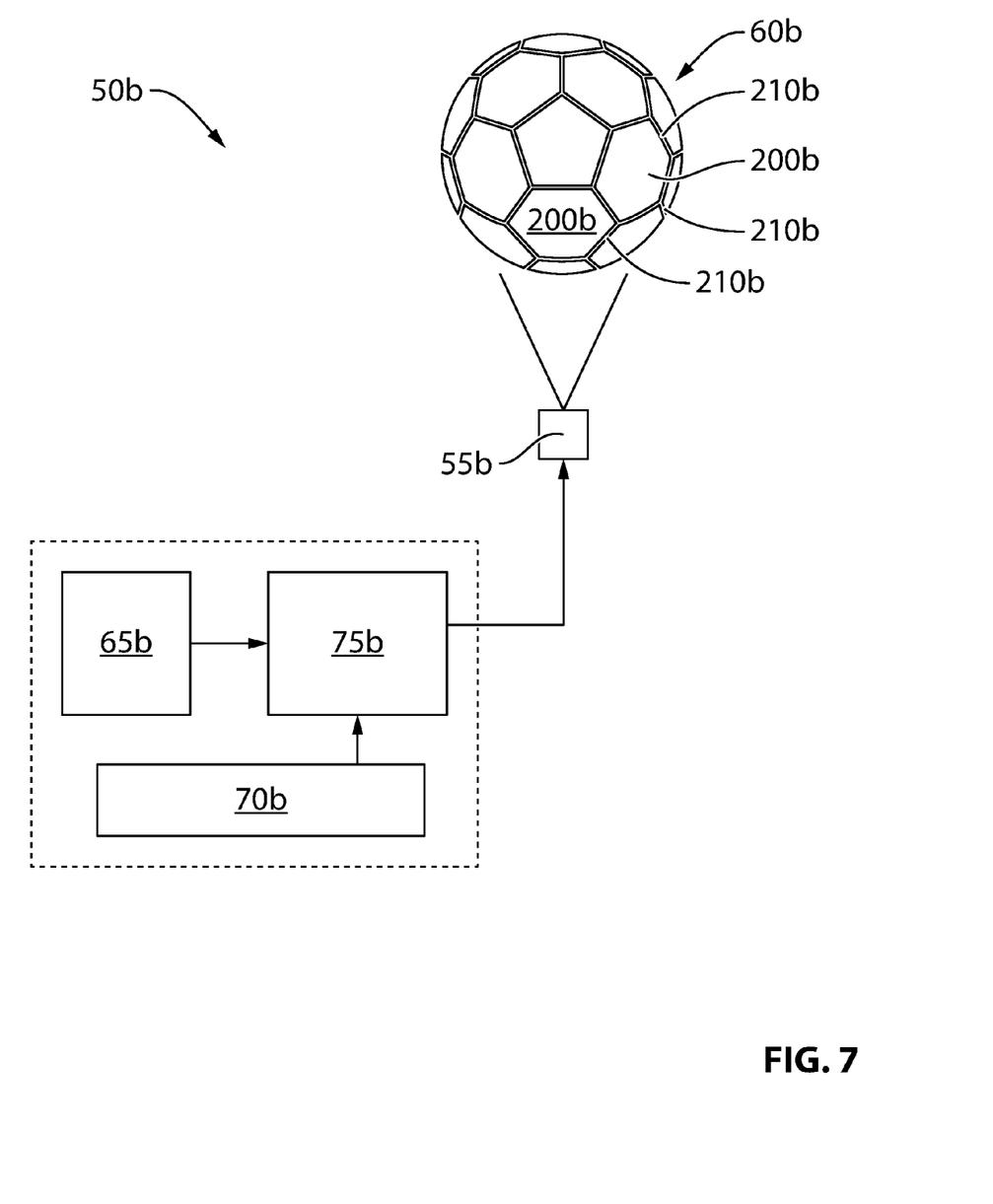
FIG. 7 is a schematic drawing of a system in accordance with another embodiment.

Referring to FIG. 7, another embodiment of a system for screen correction is generally shown at 50b. In the present embodiment, like components of the system 50b bear like reference to their counterparts in the system 50, except followed by the suffix "b". In the present embodiment, the system 50b includes a projector 55b, a screen 60b, a memory storage unit 65b, an input device 70b, and a correction engine 75b.

In the present embodiment, the system 50b includes a single projector 55b. The system 50b further includes a screen 60b having a 3D shape. In particular, the screen 60b includes a plurality of planar facets 200b at various angles to form a ball shape. It is to be appreciated that where two planar facets 200b meet, a sharp edge comprising a plurality of topographical reference points 210b is formed around each facet 200b.

In the present embodiment, the memory storage unit 65b can include model content for displaying a plurality of images on the screen 60b such that each facet 200b is to display one image or a well-defined region within a larger image. Accordingly, any deviation in the screen 60b from the model parameters would result in images extending beyond each facet boundary defined by the topographical reference points 210b. Therefore, the correction engine 75b can be used on the model content to generate screen content that is warped to fit on the facets 200b of the screen 60b.

It is to be understood that combinations, variations and subsets of the embodiments and teachings herein are contemplated. For example, it is to be appreciated that one or more of the components can be integrated within a projector, such as the projector 55. As another example of a variation, the model content stored on the memory storage unit 65 need not be provided by a content provider and can be rendered locally using model parameters by system based on camera input.

Various advantages will now be apparent to a person of skill in the art. Of note is the ability to apply a screen correction to rendered content at the location where the system 50 is set up using very little computational resources. This provides the advantage of not requiring a custom rendering for each site which may have similar parameters with minor deviations introduced during construction or though other environmental factors. Alternatively, if the system 50 includes parameters close to an ideal system where computational resources would be significantly reduced, the model content can be rendered based on the model parameters that reduce the use of computational resources to provide a faster rendering which can be subsequently corrected using the system 50.

While specific embodiments have been described and illustrated, such embodiments should be considered illustrative only and should not serve to limit the accompanying claims.

What is claimed is:

1. A system for screen correction, the system comprising:
   a memory storage unit for storing content provided by a content producer, wherein the content provided by the content producer is rendered to be displayed in accordance with given model parameters;
   a screen having screen parameters;
   an input device configured to receive the screen parameters, wherein the input device periodically scans the screen to determine the screen parameters;
   a correction engine in communication with the memory storage unit and the input device, the correction engine configured to process the content provided by the content producer and the screen parameters to generate screen content; and
   a first projector in communication with the correction engine, the first projector configured to receive a first portion of the screen content and to project the first portion of the screen content onto the screen.

2. The system of claim 1, further comprising a second projector in communication with the correction engine, the second projector configured to receive a second portion of the screen content and to project the second portion of the screen content onto the screen, wherein the first portion of the screen content and the second portion of the screen content overlap on the screen.

3. The system of claim 2, wherein the screen is non-planar.

4. The system of claim 3, wherein the screen is curved.

5. The system of claim 1, wherein the screen includes a plurality of topographical reference points.

6. The system of claim 5, wherein the plurality of topographical reference points defines a plurality of facets.

7. The system of claim 1, wherein the input device is a camera configured to measure the screen parameters.

8. The system of claim 7, wherein the camera measures the screen parameters using a calibration pattern projected by the first projector.

9. The system of claim 1, wherein the input device is a 3D scanning unit.

10. A method of screen correction, the method comprising:

storing content provided by a content producer on a memory storage unit, wherein the content provided by the content producer is rendered to be displayed in accordance with given model parameters;

scanning a screen to determine screen parameters periodically with an input device;

receiving, at a correction engine, the screen parameters of the screen from the input device;

generating screen content by processing the content provided by the content producer and the screen parameters at the correction engine; and projecting at least a first portion the screen content onto the screen using a first projector in communication with the correction engine.

11. The method of claim 10, further comprising projecting a second portion of the screen content onto the screen using a second projector in communication with the correction engine, wherein the first portion of the screen content and the second portion of the screen content overlap on the screen.

12. The method of claim 11, wherein projecting the first portion and the second portion of the screen content the screen comprises projecting on a non-planar surface.

13. The method of claim 10, further comprising defining a plurality of facets using a plurality of topographical reference points on the screen.

14. The method of claim 10, wherein receiving the screen parameters comprises measuring the screen parameters with the input device.

15. The method of claim 14, further comprises projecting a calibration pattern to measure the screen parameters.

16. The method of claim 10, wherein the input device is a camera.

17. The method of claim 10, wherein the input device is a 3D scanning unit.

18. A non-transitory computer readable medium encoded with codes, the codes for directing a processor to:

store content provided by a content producer on a memory storage unit, wherein the content provided by the content producer is rendered to be displayed in accordance with given model parameters;

scan a screen to determine screen parameters periodically with an input device;

receive the screen parameters of the screen from the input device;

generate screen content by processing the content provided by the content producer and the screen parameters at a correction engine; and project at least a first portion the screen content onto the screen using a first projector in communication with the correction engine.

* * * * *